Aug. 11, 1931.       H. CORDY       1,818,116
AEROPLANE
Filed Dec. 17, 1929       4 Sheets-Sheet 1

INVENTOR.
HARRY CORDY
BY
ATTORNEYS.

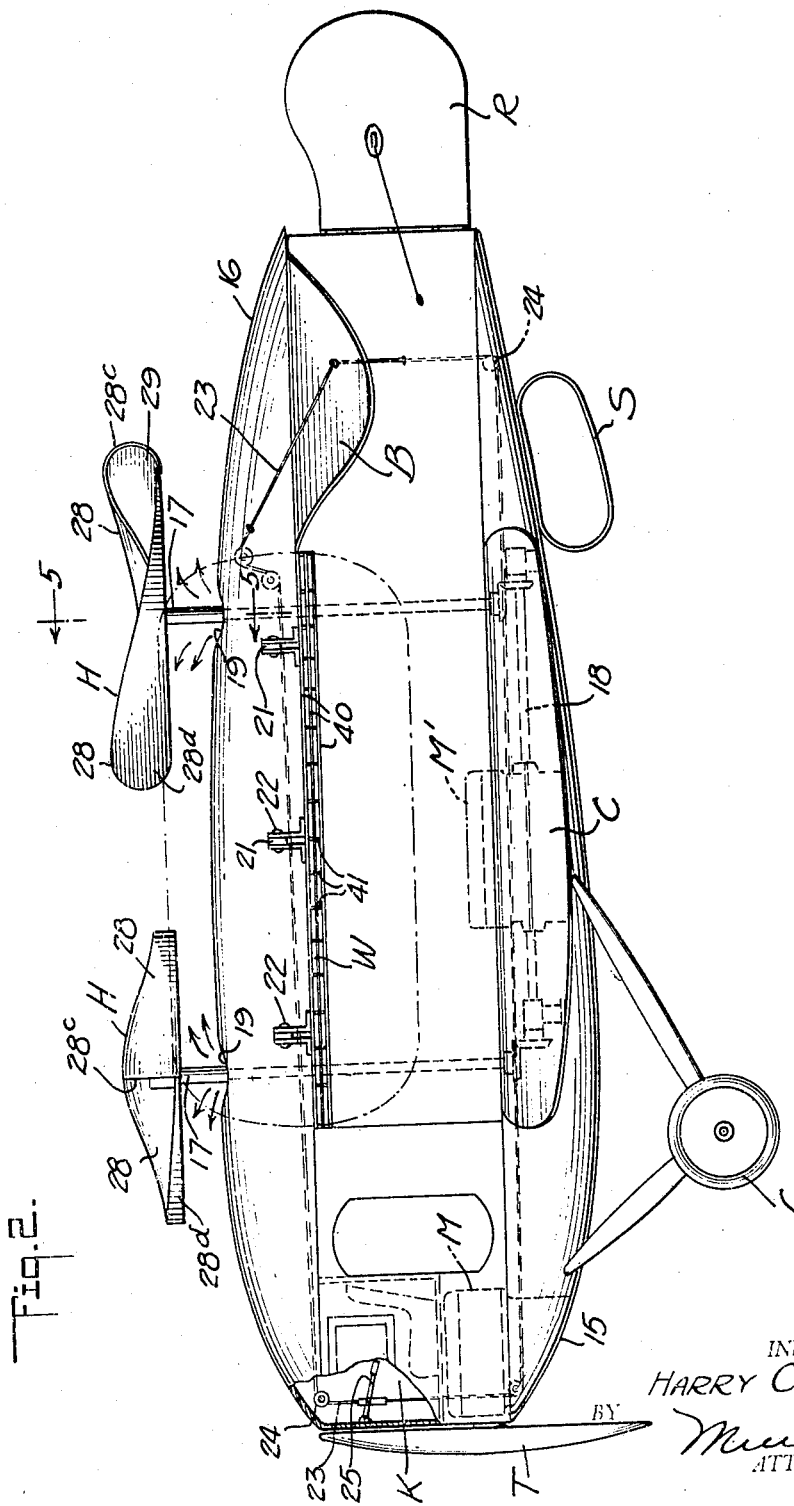

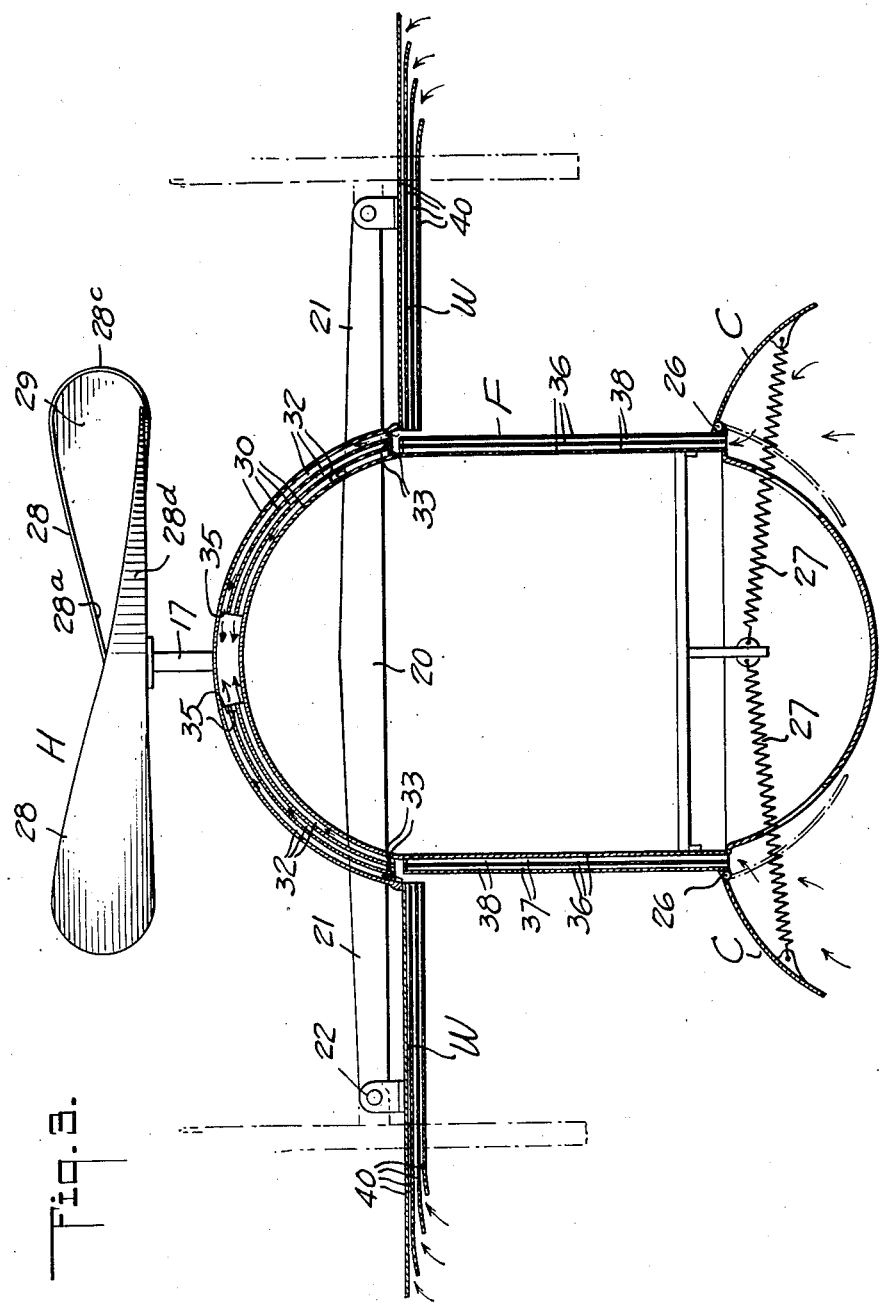

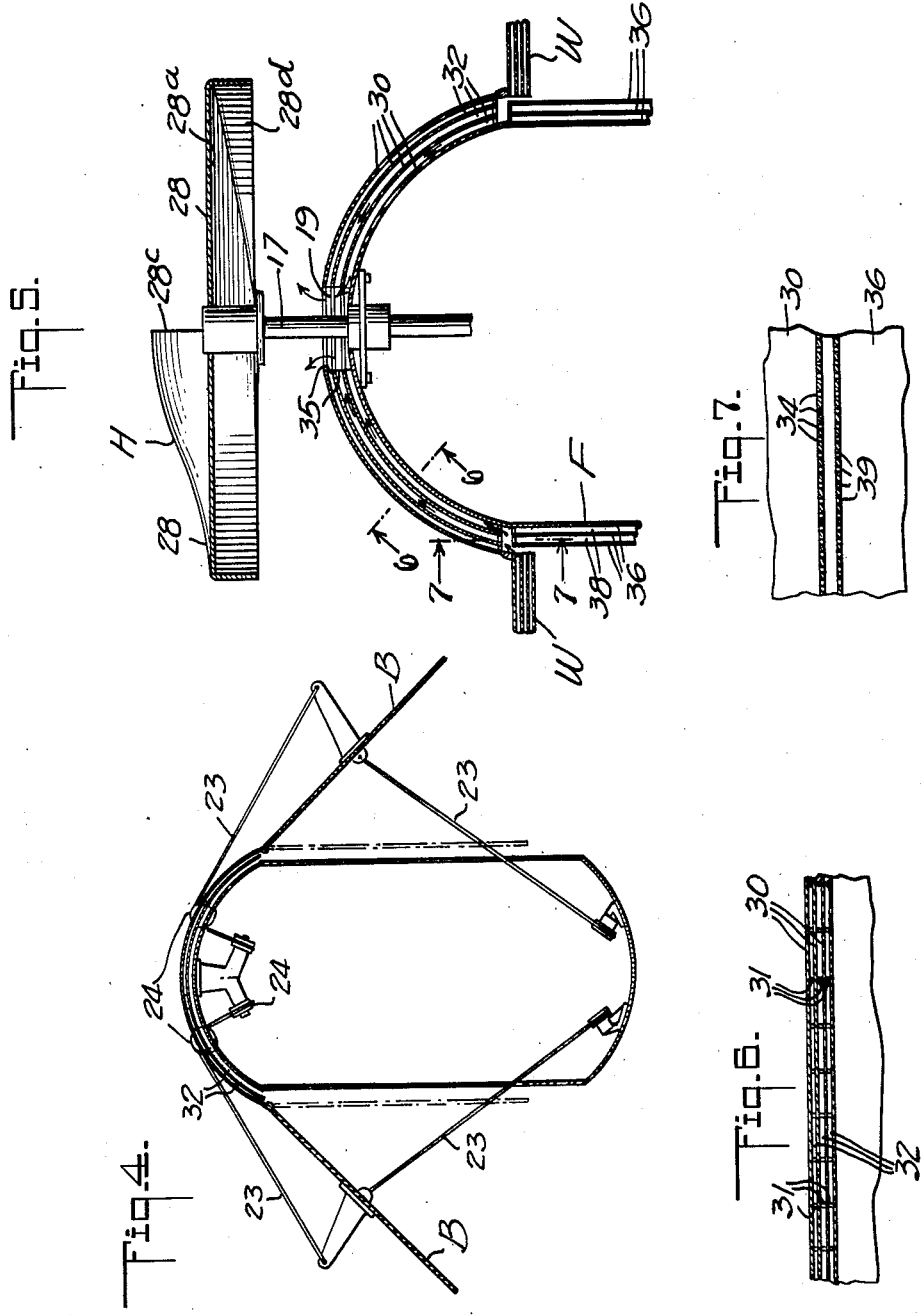

Patented Aug. 11, 1931

1,818,116

UNITED STATES PATENT OFFICE

HARRY CORDY, OF LOS ANGELES, CALIFORNIA

AEROPLANE

Application filed December 17, 1929. Serial No. 414,741.

My invention relates to aeroplanes, and it has for a purpose the provision of an aeroplane of the helicopter type which is characterized by a new form of propeller operable to produce a superior degree of lift and to thus effect a true vertical take-off, and a fuselage, stabilizers and wings which operate separately, or together, or in conjunction with the helicopter propeller and to utilize air pressure produced during descent of the aeroplane to retard the aeroplane so effectively as to permit of a vertical landing and at a very slow speed, and to thus allow landing of the aeroplane in a very restricted area.

I will describe only one form of aeroplane, including one form of helicopter propeller, and will then point out the novel features thereof in claims.

In the accompanying drawings:

Fig. 2 is a view showing the aeroplane in side elevation.

Figure 1:
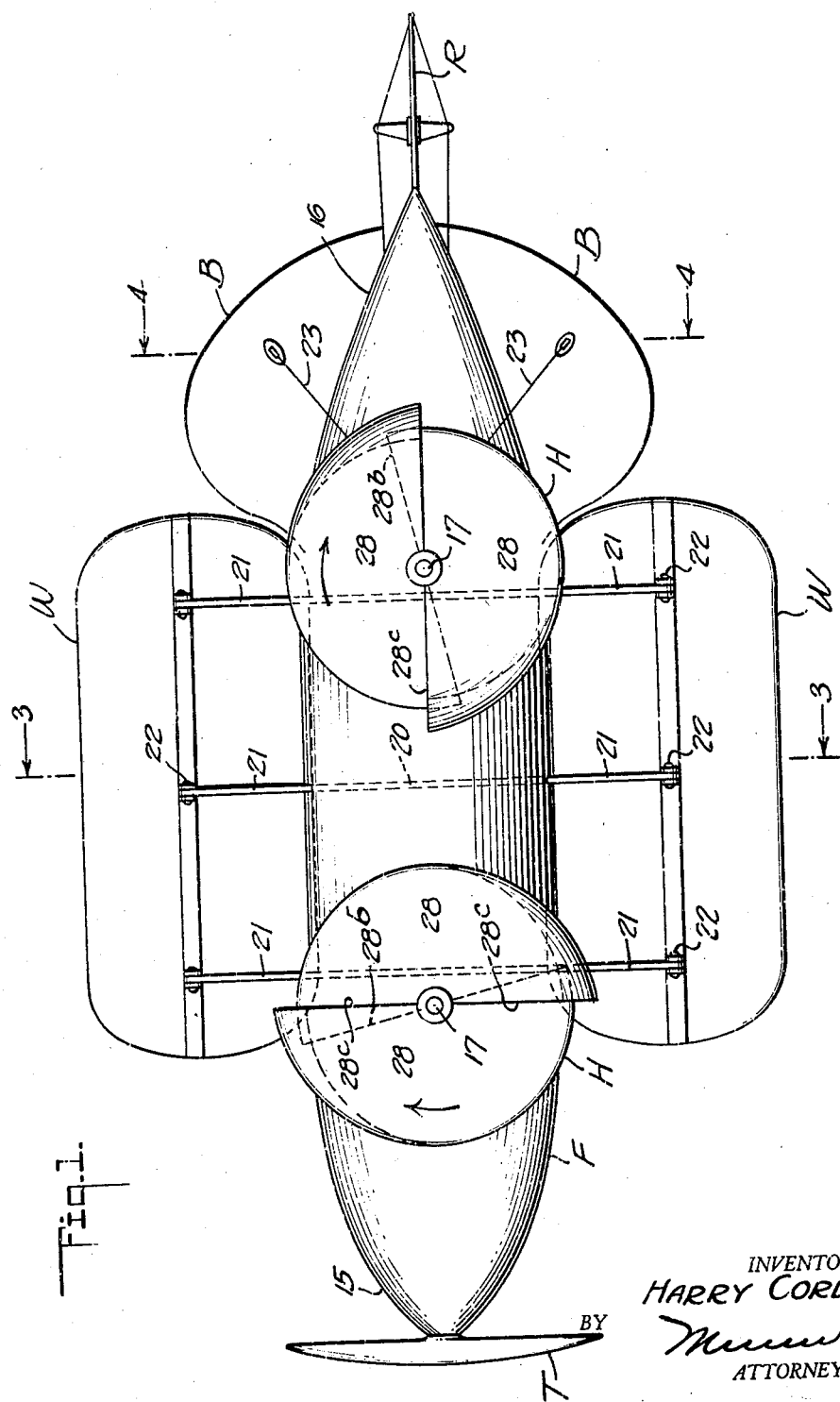
Fig. 1 is a view showing in top plan one form of aeroplane embodying my invention.

Figs. 3 and 4 are vertical sectional views taken on the lines 3—3 and 4—4, respectively, of Fig. 1.

Fig. 5 is an enlarged vertical sectional view taken on the line 5—5 of Fig. 2.

Figs. 6 and 7 are enlarged fragmentary sectional views taken on the lines 6—6 and 7—7 of Fig. 5.

In carrying out my invention, I provide a fuselage F of conventional construction in that it is provided with a rounded nose 15 and a tapered tail 16, the top wall being rounded as best shown in Fig. 5 and merging into the side walls thereof. The fuselage is provided with the usual landing gear G and a tail skid S, the interior of the fuselage being of conventional construction with its forward end provded with an operator's compartment K, as best shown in Fig. 2.

The nose of the fuselage is provided with a tractor propeller T operable by a motor M, while disposed above the fuselage at points spaced along the length of the fuselage, are a pair of helicopter propellers H. These propellers H are fixed to vertical shafts 17 which extend downwardly through the fuselage for operative connection to the shaft 18 of a motor M' suitably supported within the fuselage. The precise construction of the propellers will be described hereinafter, but it is important to note at this point that the shafts 17 extend through openings 19 in the top wall of the fuselage, as best illustrated in Fig. 5.

A plurality of beams 20 are fixed in and extend transversely through the fuselage F to provide a plurality of laterally disposed arms 21 on the outer ends of which are pivoted, as indicated at 22, a pair of wings W. These wings are mounted to occupy two extreme positions, one of which is shown in solid lines in Fig. 3, and the other in dash lines, and it will be observed that the wings are mounted off-center with respect to their longitudinal axes in order that they will normally tend to assume the vertical positions shown in dash lines.

At the rear of these wings W a pair of horizontal stabilizers B are mounted to swing about axes extending substantially longitudinally of the fuselage and operable by a continuous cable 23 trained over pulleys 24 and operatively connected to a control lever 25 in the operator's compartment, as shown in Fig. 2. The shape and mounting of these stabilizers are such that they contribute to the retardation of the aeroplane in descent, in addition to effecting a horizontal stabilization of the aeroplane, and as will be observed from Fig. 4, they are capable of occupying the vertical position shown in dash lines and the inclined position shown in solid lines.

In addition to the stabilizers B, the rear end of the fuselage is provided with the usual rudder R, which, as will be understood, is provided with a suitable control operable from the operator's compartment of the fuselage.

As best shown in Fig. 3, the fuselage F is provided with a pair of wings C pivoted about axes 26 so as to occupy the two extreme positions shown in solid lines and dash lines. These wings are normally urged to the dash line position by means of springs 27, and hence are movable to the solid line position against the action of the springs. The wings are of arcuate form and are mounted in respect to the side walls of the fuselage so that when they are in open position, they function to direct air into the side walls of the fuselage, as will be described in greater detail hereinafter.

The helicopter propellers H are identical in construction, and consequently a detailed description of one will suffice for both. By comparison of the several views of the propeller H, it will be clear that it is of substantially disk form and made up of two portions 28 which are identical in construction but arranged successively about the axis of the propeller in order that when in operation these portions will perform certain functions. Each portion 28 is made of sheet metal or other suitable material spirally inclined with respect to the axis of the propeller, so as to provide an under or bottom surface 28$^a$ of spirally inclined form. Each portion 28 is of substantially semi-circular form, with those parts of the linear edge thereof which are disposed at opposite sides of the axis 17 of the propeller, constituting the trailing and leading edges of such portion, as indicated at 28$^b$ and 28$^c$. At the curved edge of the portion 28 is provided a depending flange 28$^d$ which, as shown in Fig. 5, is curved from the leading edge 28$^c$ rearwardly, but which merges into a vertical portion that decreases in width as it proceeds toward the trailing edge 28$^b$. The trailing edge of one portion is disposed in overlapped relation and below the leading edge of the other portion, and in consequence, there is provided between these overlapped areas an entrance opening indicated at 29 through which air passes to the bottom surface of the portion 28 when the propeller is rotated in the direction of the arrow in Fig. 1. It will therefore be understood that in the operation of the propeller, air is caused to flow beneath the two portions entering at the leading edge and leaving at the trailing edge, and in so doing the air is caused to traverse the spirally inclined surfaces 28$^a$ to produce lifting impulses. With each revolution of the propeller two such lifting impulses are generated, and by reason of the relatively large area presented by the two portions of the propeller and upon which the air is forced to act, the propeller in actual practice produces a lifting action superior to the conventional type of helicopter propeller. The flanges 28$^d$ function to confine the air against radial displacement from the surfaces 28$^a$ so that the air is compelled to traverse the entire length of such surfaces before being discharged from the propeller.

The top wall of the fuselage F is shown in Fig. 5 as made up of a plurality of partitions 30, held in spaced relation by intervening strips 31 so that there is formed between the partitions a plurality of passages 32. These passages have entrance ends 33 restricted by small perforations 34 as shown in Fig. 7, and exit ends 35 which communicate with the openings 19. Similarly, the side walls of the fuselage are formed of a plurality of partitions 36 spaced by strips 37 to form intervening passages 38 having entrance ends at the lower edges of the wall, and exit ends at the upper edges of the wall, the exit ends being restricted by perforations 39 as best shown in Fig. 7. Through the passages 32 and 38, air is adapted to flow under any descending movement of the fuselage, the air being subdivided into currents which separately traverse the passages of the side walls so as to be discharged through the perforations 39 into the passages 32 of the top wall of the fuselage and through the perforations 34. It will be observed in Fig. 5 that there is a spacing of the perforations 34 and 39 in order that air may enter the passages 32 independently of the passages 38.

The wings W are also formed of a plurality of partitions 40 spaced by strips 41 to form intervening air passages but the outer marginal edges of the partitions flare downwardly to provide entrance ends for air. The inner longitudinal edges of the partitions provide exits for the air, and when these wings are in horizontal position as shown in Figs. 3 and 5, the currents of air as discharged from the passages are delivered to the entrance ends 33 of the passages 32 so that they may subsequently traverse the passages 32 to be discharged beneath the propellers H. It is important to note that the forward edges of the wings W are closed to prevent the admittance of air into the passages during the forward movement of the aeroplane.

By providing a fuselage constructed as described, the many air passages provided both in the fuselage and in the wings W function in the descent of the aeroplane to permit air to flow through the passages and in a manner to restrict the air flow and thus set up a counter pressure which acts to greatly retard the descending movement of the aeroplane. It will be understood that the air in traversing the passages sets up a skin friction which reduces further resistance to the descending movement of the aeroplane, this action being augmented by the curvature of the partitions 30 forming the top wall of the fuselage. The air currents as discharged into the openings 19 pass upwardly and against the spirally inclined surfaces 28$^a$ of both portions 28 and of both propellers H, and thus act to aid in rotating the propellers so that the lifting action of the latter is augmented to the end of further decreasing the descending movement of the aeroplane. It will of course be understood that the surface area presented by the wings W when in horizontal position offer further resistance to the descent of the aeroplane, and these wings are automatically moved to horizontal position by reason of their offset mounting immediately upon any descending movement of the fuselage. The inner longitudinal edges of the wings abut the lower edges of the top wall of the fuselage thus defining the horizontal position of the wings so that their lower surfaces are presented to the air under any descending movement of the fuselage.

The wings C are automatically opened under descending movement of the fuselage so as to guide air into the lower ends of the passages 38, the wings themselves presenting surfaces to resist the downward movement of the fuselage, as will be understood.

The stabilizers B also aid in retarding descending movement of the aeroplane, and they also function to direct air into the entrance ends of the passages 32 of the top wall of the fuselage. That they may function in this manner, the stabilizers are moved to the 45° position shown in Fig. 4, or to any other position in which they coact with the side walls of the fuselage to trap air therebetween and direct it into the passages 32.

In a take-off of the aeroplane, the propellers H function to produce a vertical lift as has been described, forward movement of the areoplane being attained by the tractor propeller T. Under any ascending movement of the aeroplane, the wings W occupy vertical position and automatically through pressure of air downwardly on the upper surfaces of the wings, it being understood that the major pressure is at the inner side of the pivots 22 and consequently the wings will be forced to vertical position. The wings C occupy a closed position under the action of the springs 27 so that their surfaces do not function to impede upward movement of the aeroplane. The stabilizers B occupy the vertical position shown in dash lines in Fig. 4 during ascent of the aeroplane so as not to offer any resistance to such ascension, while in horizontal flight of the aeroplane, the stabilizers occupy the angular position shown in full lines in order to effect horizontal stabilization of the aeroplane.

Although I have herein shown and described only one form of aeroplane, including one form of helicopter propeller embodying my invention, it is to be understood that various changes and modifications may be made herein without departing from the spirit of the invention and the spirit and scope of the appended claims.

I claim:

1. A fuselage for aeroplanes, the top and side walls of which are constructed of a plurality of partitions spaced apart to define air passages with entrance ends at the lower edges of the walls.

2. A fuselage for aeroplanes having a top of rounded form and constructed of a plurality of partitions spaced apart to define intervening air passages, the entrance ends at the bottom of the top and exit ends at the top of the top.

3. A fuselge for aeroplanes having a top and sides formed of a plurality of partitions arranged in spaced relation to provide intervening air passages with the entrance ends of the passages at the bottom of the top and sides, and the exit ends of the passages of the side walls in communication with the entrance ends of the passages of the top wall.

4. A fuselage for aeroplanes having a top and sides formed of a plurality of partitions arranged in spaced relation to provide intervening air passages with the entrance ends of the passages at the bottom of the top and sides, the exit ends of the passages of the side walls in communication with the entrance ends of the passages of the top wall, and the exit ends of the passages at the top of said wall.

5. A fuselage for aeroplanes as embodied in claim 3 wherein wings are provided adjacent the entrance ends of the passages in the side walls for directing air into said passages.

6. A fuselage for aeroplanes as embodied in claim 3 wherein wings are mounted on the fuselage in such relation to the top wall thereof as to direct air into the entrance ends of the passages of the top wall.

7. A fuselage for aeroplanes as embodied in claim 3 wherein laterally disposed wings are mounted on the fuselage, and each wing is made up of a plurality of partitions spaced apart to provide intervening passages through which air is adapted to flow from the outer edges of the wings to the inner edges, the outer edges of the partitions being flared to provide relatively wide entrance ends for the passages and the exit ends for the passages being disposed adjacent the entrance ends of the passages of the top wall so as to deliver air from the wing passages into the top wall passages.

8. In an aeroplane, a fuselage having a plurality of passages therein with the entrance ends downwardly disposed to cause air to traverse the passages during descent of the fuselage, and exit ends disposed upwardly to permit the air to pass upwardly from the passages, the area of said passages being such as to restrict the flow of air through the passages and to thereby set up resistance to the descent of the fuselage.

9. A fuselage for aeroplanes having passages therein with entrance ends disposed downwardly and exit ends disposed upwardly so that during descent air will be caused to traverse the passages, said passages being of restricted area and of curved form to impede the passage of air therethrough and to thereby generate sufficient resistance to retard the descent of the fuselage.

10. In an aeroplane, a fuselage having air passages therein with their entrance ends disposed downwardly and their exit ends disposed upwardly, and a helicopter propeller disposed above the fuselage and having at least one spirally inclined surface against which the air as discharged from said passages is adapted to impinge for aiding the propulsion of the propeller.

11. In an aeroplane, a fuselage having a top provided with a plurality of passages for air, the entrance ends of the passages being disposed downwardly to cause air to traverse the passages during descent of the fuselage and exit ends disposed upwardly to permit the air to pass upwardly from the passages, the side walls of said fuselage having a plurality of passages through which air is adapted to flow during descent of the fuselage, means for directing air into the passages of the top, means for directing air into the passages of the side walls, and means for mounting both of said means on the fuselage so that they are rendered inactive to direct air into the passages during ascent of the fuselage.

12. In an aeroplane, a fuselage having a plurality of passages in the side walls thereof with the entrance ends thereof disposed downwardly to cause air to traverse the passages during descent of the fuselage, and wings mounted on the fuselage and responsive to the pressure of air during descent of the fuselage to occupy a position in which they aid in retarding the descent of the fuselage and direct air into the entrance ends of the passages.

13. In a fuselage as embodied in claim 12 wherein means is provided on the fuselage and connected to the wings for yieldably urging the latter to a folded position in which their surfaces present no impediment to the ascent of the fuselage.

14. In an aeroplane, a fuselage provided with air passages having entrance ends disposed downwardly, lateral stabilizing planes mounted on the fuselage to occupy folded and extended positions and when in extended position to direct air into the entrance ends of said passages, and means for moving the planes to either of said positions.

15. A fuselage for aeroplanes having its sides formed of a plurality of partitions spaced apart to provide intervening air passages, and wings adjacent the passages for directing air thereinto.

16. A fuselage for aeroplanes having a top formed of a plurality of partitions spaced apart to provide intervening air passages, and wings adjacent the passages for directing air thereinto.

HARRY CORDY.